(12) United States Patent
Weber et al.

(10) Patent No.: US 6,289,201 B1
(45) Date of Patent: Sep. 11, 2001

(54) METHOD AND SYSTEM FOR MULTILAYER SERVICE MANAGEMENT

(75) Inventors: Mary Maureen Weber; George Xenakis, both of Tempe; Gerald James Hogg, Fountain Hills; James Edward Greenwood, Jr., Scottsdale, all of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/165,379

(22) Filed: Oct. 2, 1998

(51) Int. Cl.[7] .................................................. H04B 7/185
(52) U.S. Cl. ........................ 455/13.1; 455/428; 455/12.1
(58) Field of Search .................................. 455/13.1, 12.1, 455/13.2, 13.3, 427, 428, 430; 379/230, 220, 219; 370/230, 254, 270

(56) References Cited

U.S. PATENT DOCUMENTS

| | | | |
|---|---|---|---|
| 4,562,572 | * 12/1985 | Goldman et al. | 370/80 |
| 5,583,860 | * 12/1996 | Iwakawa et al. | 370/232 |
| 5,629,978 | 5/1997 | Blumhardt et al. | 379/201 |
| 5,668,955 | 9/1997 | deCiutiis et al. | 379/130 |
| 5,687,363 | 11/1997 | Oulid-Aissa et al. | 395/604 |
| 5,721,909 | 2/1998 | Oulid-Aissa et al. | 395/610 |
| 5,764,977 | * 6/1998 | Oulid-Aissa et al. | 707/10 |
| 5,892,916 | * 4/1999 | Gehlhaar et al. | 395/200 |
| 5,953,404 | * 9/1999 | Fikis et al. | 379/230 |
| 6,094,435 | * 12/2000 | Hoffman et al. | 370/414 |
| 6,167,028 | * 12/2000 | Harris | 370/230 |

* cited by examiner

*Primary Examiner*—William Trost
*Assistant Examiner*—Congvan Tran
(74) *Attorney, Agent, or Firm*—Jennifer B. Wuamett; Frank J. Bogacz (57) ABSTRACT

Methods (400, 500, 600, 700, 800, and 900) and a multilayer service management system (300) enable mutilayer service management in a global network environment in a communication system (100) which includes a core network (230) and multiple Distributed Virtual Network Segments (DVNSs) (240). The system (300) includes a network service manager (315) capable of managing a set of services for operating the core network, DVNS service managers (DVNSMs) (345, 347) residing within a core side (340) and a product side (335) of each item of DVNS equipment (330) for managing a first and second set of services associated with the DVNS and also a set of value added services (352) provided through the DVNS equipment (330), and a processor/server 385 residing within customer premises equipment (CPE) (370) for enabling provision of value added services to the CPE. Methods (400, 500, 600, 700, 800, and 900) enable management of services using the service management system (300) by distributing service management across the layers of the network architecture (200).

9 Claims, 7 Drawing Sheets

METHOD AND SYSTEM FOR MULTILAYER SERVICE MANAGEMENT

CROSS-REFERENCE TO RELATED APPLICATIONS

This application is related to the following applications, which are assigned to the same assignee as the present invention: application Ser. No. 08/873,877, filed Jun. 12, 1997, entitled "Global Telecommunications Systems with Distributed Virtual Networks and Method of Operation Therefor", and Application Ser. No. 09/032,827, filed Mar. 2, 1998, entitled "System and Method for Managing Network Resources," both of which are hereby incorporated by reference.

FIELD OF THE INVENTION

This invention relates generally to the field of satellite communication systems. More specifically, this invention relates to a method and system for multilayer service management in a satellite communication system.

BACKGROUND OF THE INVENTION

In recent years, the telecommunication industry has seen the development and deployment of the first commercial Nongeostationary Orbit (NGSO) satellite constellations to respond to the rapidly expanding demand for global communication services. Such satellite constellations can be viewed as a global network of nodes having the potential to deliver a variety of information and services to locations virtually anywhere in the world at a much lower cost than would be possible solely using prior art wireless and/or wire-based terrestrial networks.

Typically, a terrestrial communication network is managed by a central network operator and possibly a number of distributors. Distributors act as service providers for the system and wholesale their service capacity to retailers or sell capacity directly to customers. Such terrestrial communication networks generally have a defined coverage region which is not global in nature, and central network operators generally provide capacity to customers in one or more specified geographic regions.

It would be desirable to structure satellite communication systems to enable distributors and/or service providers to manage quasi-independent global virtual networks providing services that can be differentiated from services of other distributors and/or service providers. Desirably, such independent virtual networks would be based on a single, physical core satellite network. An effective way to manage services provided both by distributors and through external sources through such a physical core satellite network has not yet been developed.

Thus, what is needed is a communication system and method to enable service management in a global network environment including independent virtual networks. What is also needed is a communication system and method for allowing independent virtual network operators to incorporate existing or new services into their equipment for operation.

What is also needed is a communication system and method for allowing independent virtual network operators or customer equipment operators (i.e. end users) to incorporate external value added services into their equipment for operation.

BRIEF DESCRIPTION OF THE DRAWINGS

The invention is described below with particularity in the appended claims. However, other features of the invention will become more apparent and the invention will be best understood by referring to the following detailed description in conjunction with the accompanying drawings, in which like reference designators are used to designate like elements, and in which:

DETAILED DESCRIPTION OF THE DRAWINGS

The present invention provides, among other things, a system and method for multi-layer service management in a communication system. The system and method of the present invention enable the management of services across multiple layers of architecture and equipment in a satellite communication system having a core network and distributed virtual networks.

The present invention is advantageous in that it enables management of services through a core physical network in a distributed fashion across multiple layers of the communication system at the level of the independent virtual networks and at a higher central level. The method and system of the present invention distribute service management functions in a network containing a multilayered architecture, thereby enabling management of services at each independent virtual network level and overall management of services at a central or core network system level.

Another advantage of the present invention is that it provides an effective way for overall system management of services provided by distributors through a physical core satellite network. Yet another advantage of the present invention is that it enables service management in a distributed fashion so as to relieve the burden that would otherwise be placed on one central core operations center, referred to herein as a Network Operations Control Center.

Additional advantages and features of the invention will become apparent from the description which follows and may be realized by means of the instrumentalities and combinations particularly pointed out in the appended claims.

Figure 1:
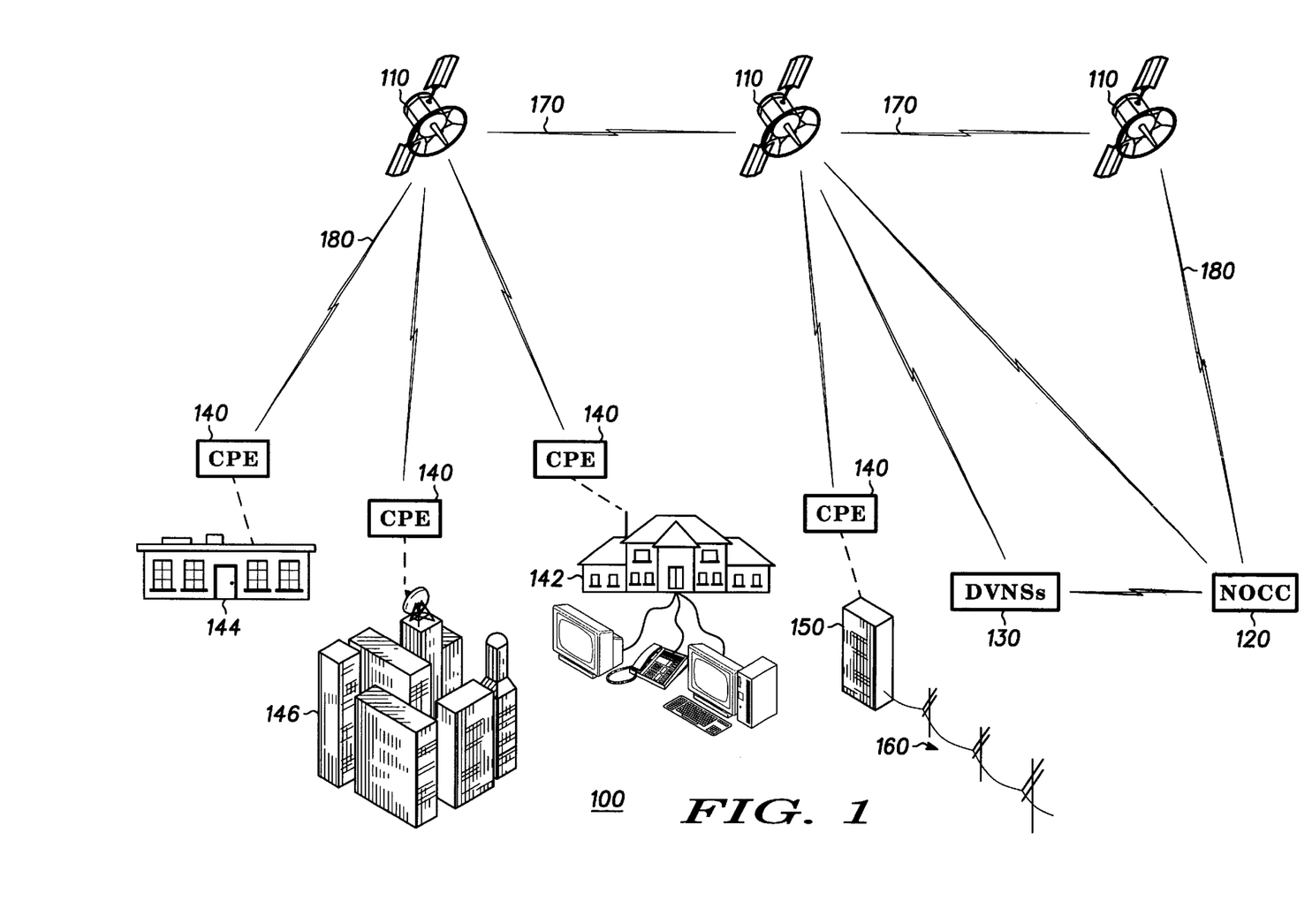
FIG. 1 illustrates a satellite communication system in accordance with a preferred embodiment of the present invention.

FIG. 1 illustrates a satellite communication system in accordance with a preferred embodiment of the present invention. System 100 includes a constellation of NGSO satellites 110, at least one Network Operations Control Center (NOCC) 120, one or more Distributed Virtual Network Segments (DVNSs) 130, and at least one communication terminal such as Customer premesis equipment (CPE) 140, which could include, for example, home terminal equipment 142, small business terminal equipment 144, corporate terminal equipment 146, or gateway terminal equipment 150 linked to PSTN 160.

In a preferred embodiment, system 100 includes a LEO satellite network including a constellation of satellites orbiting the earth at approximately 800 miles above the surface. Any number of satellites could be used in accordance with the present invention. Also, in alternate embodiments, system 100 could include Medium Earth Orbit (MEO) or Geostationary Earth Orbit (GEO) satellites, although LEO satellites enable the lowest transit delays to be achieved. System 100 desirably provides high data rate transmission with low transit delays over the populated areas of the earth's surface.

In a preferred embodiment, satellites are interconnected via optical intersatellite links (OISLs) 170 to provide a global communication network infrastructure. In alternate embodiments, different types of links (e.g., RF links) could be used. OISLs 170 are not necessary in the present invention, however. In an alternative embodiment, a communication could be routed down to or up from any one of many earth-based terminals through a bent pipe configuration (not shown).

In general, satellites 110, DVNSs 130, CPE 140, and other nodes of communication system 100 could be viewed as a network of nodes. Each node of communication system 100 is or could be in data communication with other nodes through communication links. Additionally, all nodes of communication system 100 are, or could be, in data communication with other communication devices dispersed throughout the world through PSTN 160 and/or conventional terrestrial communication devices coupled to PSTN 160 through conventional terrestrial facilities. In the exemplary configuration shown in FIG. 1, one or more satellites 110 handle traffic to and from CPE 140 over one or more communication links, such as link 180.

In a preferred embodiment, system 100 provides fixed satellite services with a variety of user data rates to one or more of a variety of types of CPE 140, including for example, small, very small, and ultra-small satellite earth terminals. It also provides high data rate connections to gateway earth terminals that interface to the PSTN. In alternate embodiments, communication terminals, such as CPE 140, could be any one of numerous devices capable of transmitting and/or receiving information or data through system 100, such as, for example, mobile or stationary telephones, radios, computers or similar devices.

FIG. 1 illustrates only a few of CPE 140 for ease of illustration. However, any number of CPE 140 could be used in system 100. In alternate embodiments, system 100 could be networked together with one or more terrestrial networks and/or one or more bent pipe satellite networks and/or other similar systems. In a preferred embodiment, CPE 140 provide a system subscriber or user with an interface to system 100 and also support a variety of network management functions.

Figure 2:
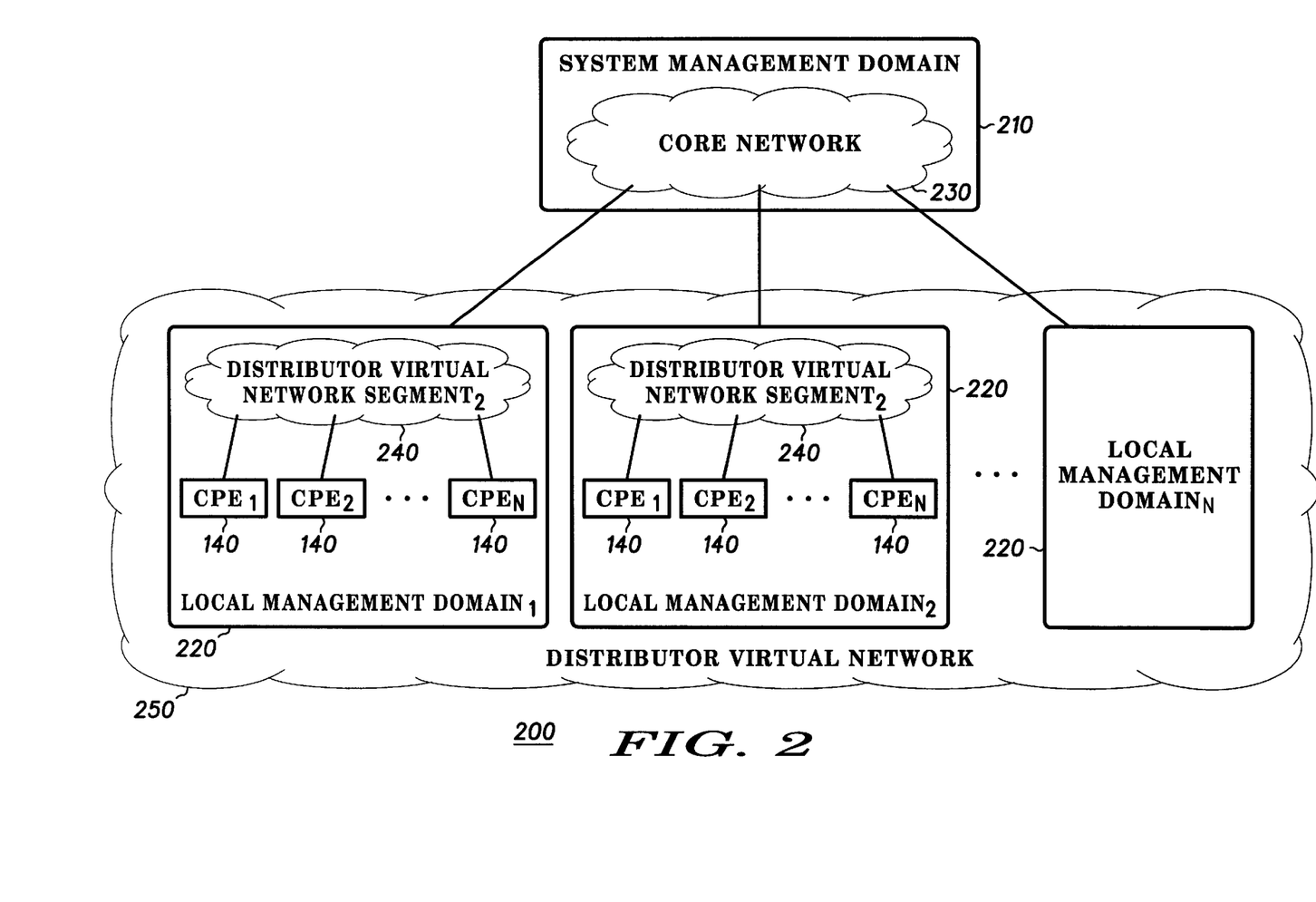
FIG. 2 illustrates a conceptual architecture of a multilayer service management topology in accordance with a preferred embodiment of the present invention.

FIG. 2 illustrates a conceptual architecture of a multi-layer service management topology in accordance with a preferred embodiment of the present invention. The architecture for the system of the present invention is a traditional hierarchy of configurable items (CI's) with their associated interfaces. The architecture desirably is designed to support a hierarchical business structure wherein a primary core network is managed by a central global network operator and a number of distributors. In a preferred embodiment, a system management domain (SMD) 210, which desirably is under the control of a global network operator, is associated with core network 230, which desirably provides global connectivity.

Core network 230 can be viewed as a "fiber in the sky" network or cell relay backbone. Distributed Virtual Network 250 desirably includes multiple local management domains (LMDs) 220. Distributors control one or more LMDs 220, which each include a distributed virtual network segment (DVNS) 240. Although system 100 can include as few as one LMD 220 and DVNS 240, it is envisioned that a large number of LMDs 220 can exist within system 100. Each DVNS 240 serves as a "virtual" global (or multi-regional) network giving the illusion that the operator or service provider of the LMD controls its own global (or multi-regional) network, although the physical core network components can be shared among multiple LMDs. Each LMD 220 can include a gateway to provide an interface to a PSTN or one or more other terrestrial networks, including, for example, the Internet. Each LMD 220 also includes a plurality of CPE 140, as described with reference to FIG. 1.

Desirably, distributors act as service providers for the system, and can either wholesale their service capacity to retailers or sell directly to customers. A DVNS 240 is assigned to a specific service provider. The DVNS provides the illusion that the service provider, or distributor, operates an independent global network. The SMD 210 maintains this illusion by provisioning resources to each DVNS and coordinating operation of the DVNSs in a manner that is transparent to the subscribers. Each distributor operating within a LMD 220 is responsible for managing and operating its DVNS, including the resources, subscribers, and services. One or more items of CPE 140 are associated with each DVNS, and CPE 140 receives access to core network 230 through a service provider which controls the DVNS with which the CPE is associated. The distributed virtual network environment and architecture is discussed in further detail in application Ser. No. 08/873,877, filed Jun. 12, 1997, entitled "Global Telecommunications Systems with Distributed Virtual Networks and Method of Operation Therefor," which is incorporated herein by reference.

In a preferred embodiment of the present invention, service management may be viewed as primarily software-based applications distributed over multiple nodes of a network. The networking architecture for the method and system of the present invention embodies a distributed application platform for building and executing network wide applications. This distributed platform hides the applications from the effects introduced by distribution, and from the complexities of the underlying network service management.

Major service management systems can include, for example, provisioning systems, Service Creation Environments (SCE), configuration management systems, subscriber management systems, network security systems, session management systems, customer databases, directory services, operations center systems, and clearing house systems. SCEs facilitate product conceptualizing and information to support business cases. As part of service provisioning, customer negotiations are administered by product and configuration management applications that service providers complete through account and security management. Subscriber access and authentication capabilities are provided while preserving system integrity and restricting access into the system network management functions. New services and products are produced and simulated through a SCE in a customer independent way.

The architecture described with reference to FIG. 2 supports the multilayer system management system described with reference to FIG. 3 below to enable individual service providers to control their network services independently from other service providers. Thus, from the service provider's perspective, the system appears to be a virtual network for which the service provider can control system functions such as security, subscriber access, routing, addressing, and offered services.

Figure 3:
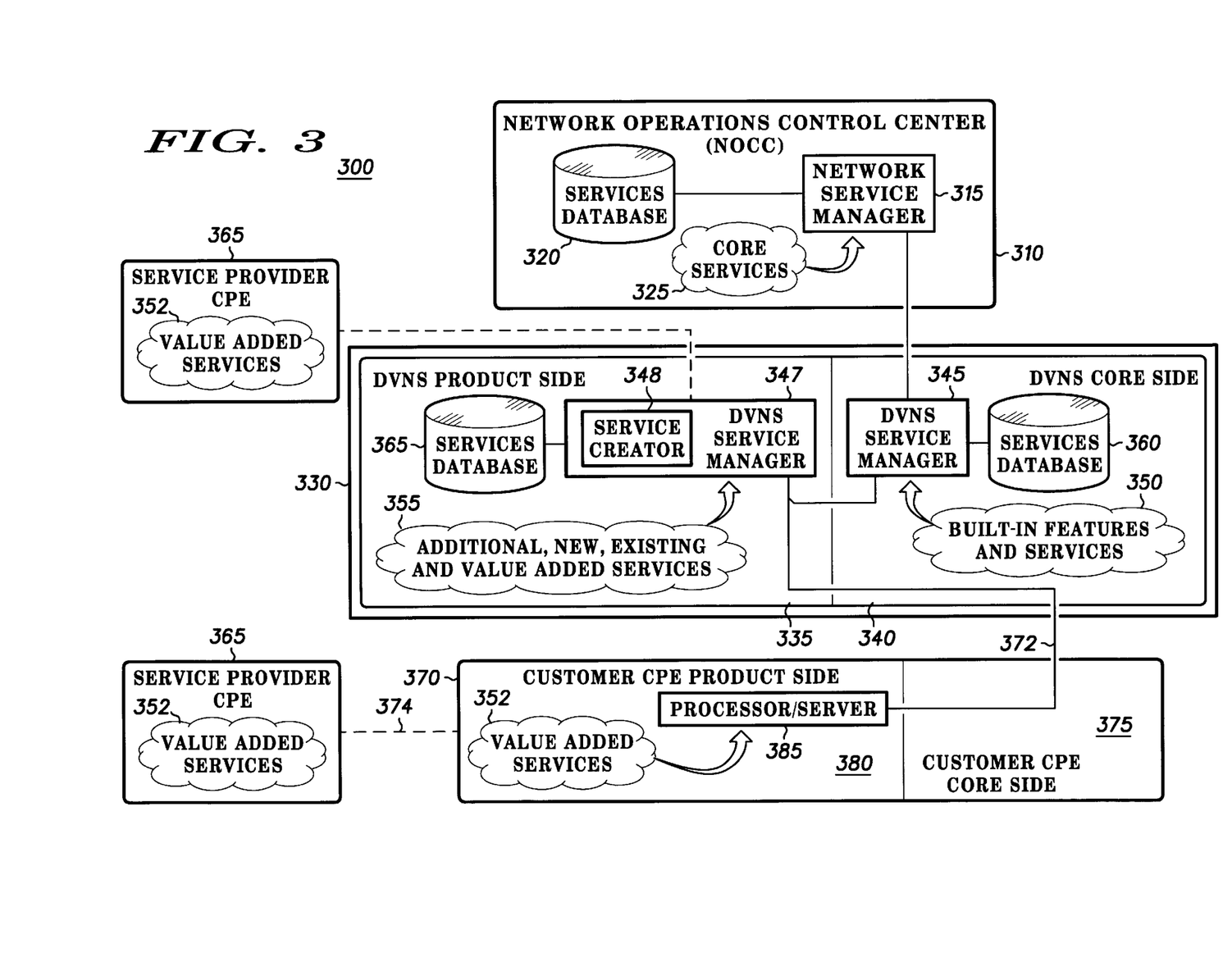
FIG. 3 illustrates a multi-layer service management system in accordance with a preferred embodiment of the present invention.

FIG. 3 illustrates a multi-layer service management system 300 in accordance with a preferred embodiment of the present invention. In a preferred embodiment of the present invention, service management is partitioned into multiple layers as shown in FIG. 3, such layers including a core services layer managed by NOCC 310, a DVNS services layer managed by DVNS 330, and a value added services layer desirably managed by DVNS 330 and provided through CPE layer 370. Connections between the multiple layers of system 300 are illustrated in FIG. 3 by solid black lines, which represent interfaces for communications and dotted lines, which represent logical connections between the layers (desirably using satellites to effectuate such connections). Dashed lines show the associations with third party service providers.

System 100 (FIG. 1) provides two fundamental core services: connectivity, or allowing a connection to be made between two or more points; and information transportation, or the ability to transport information over a connection. These fundamental system network services are provided through core network 230 (FIG. 2) and are managed through NOCC 310. Core services 325, such as system and backbone connectivity and transport services managed by NOCC 310 are managed through Network Service Manager 315, which includes hardware and software adapted to provide and manage the core services at the core network level. Transport services are provided via core network 230 (FIG. 2), which desirably is comprised of a plurality of satellites, such that data is transported from point-to-point, from point-to-multiple points, from multiple points-to-point, and/or from multiple points-to-multiple points. Service elements for providing such services, including for example, management information and services information, reside within services data base 320. In a preferred embodiment, core services 325 include services that are provided to distributors so that the distributors can operate individual DVNSs 240 (FIG. 2).

Another set of services is managed at the distributor or DVNS 330 level. Distributors of core services can be, for example, content providers, service providers, or both. The equipment used by the distributor to provide access to the system is referred to herein as the DVNS equipment, which includes DVNS core side 340 and DVNS product side 335. In a preferred embodiment, DVNS core side 340 includes DVNS service manager (DVNSM) 345, and DVNS product side 335 includes DVNS service manager (DVNSM) 347.

DVNS 330 could, however, include one DVNSM partitioned for managing services for both the core side and the product side without departing from the spirit of the present invention.

Both core side 340 and product side 335 contain hardware and software capable of carrying out service management operations at the DVNS level. Service management data bases 360 and 365 on the core and product side, respectively, contain information about the services and management of the services provided by DVNS 330. Although two service data bases 360 and 365 are shown in FIG. 3, DVNS 330 can include as few as one service data base, or multiple service data bases without departing from the spirit of the present invention.

DVNS core side 340, desirably through DVNSM 345, is linked in communication with Network Service Manager 315 of NOCC 310. DVNSM 345 is capable of managing a first set of services associated with operating the DVNS in the system. This includes, for example, basic services such as connection services and information transport services which are built into the DVNS equipment to enable the DVNS to access and operate within the core network.

DVNSM 347 associated with product side 335 desirably is capable of managing a second set of services. More specifically, software desirably residing in DVNSM 347 allows the distributor to add to the product side additional optional services to provide additional services from the network such as, for example, authentication, security management, call intercept, configuration management, nomadicity (or enabling customers to connect to accounts from any location), account management, and performance management to name a few. DVNS product side 335 also includes means, desirably in the form of a service creator 348 residing within DVNSM 347, for creating and adding a third set of services to the DVNS (or enabling access to such services). The third set of services desirably comprises value added features or services from an external source such as, for example: business related services such as advertising and business transactions, (fax, money transfer, etc.); banking services; on-line commerce; distant learning services; interactive TV; telemedicine; encryption; internet/e-mail access; leisure activities, such as High Definition Television (HDTV), home shopping, and virtual reality games; software services, such as software renting and distribution; teleconferencing; usage reporting; video conferencing; and others. Thus, distributors can offer such value added services as well as the optional services provided by the distributor (on the product side) and the built-in services (on the core side) to their customers.

Moreover, value added services 352 can be added or provided at different levels in several different ways in a preferred embodiment of the present invention. Value added services 365 can be added at the distributor or DVNS level either through DVNS product side 335 via service creator 348 within DVNSM 347 or issued through a third party employing service provider CPE 365. At the CPE or end user level, value added services 352 can be added by a third party through service provider CPE 365 at the CPE level 370 through a processor or server 385 residing within CPE product side 380 (where, in a preferred embodiment, the CPE includes a CPE product side 380 and a CPE core side 375). In the latter scenario, the distributor can remotely manage the value services from DVNS product side 335 through interface 372. Alternatively, the end-user can receive value added services 352 directly from a third party through service provider CPE 365 using interface 374.

Figure 4:
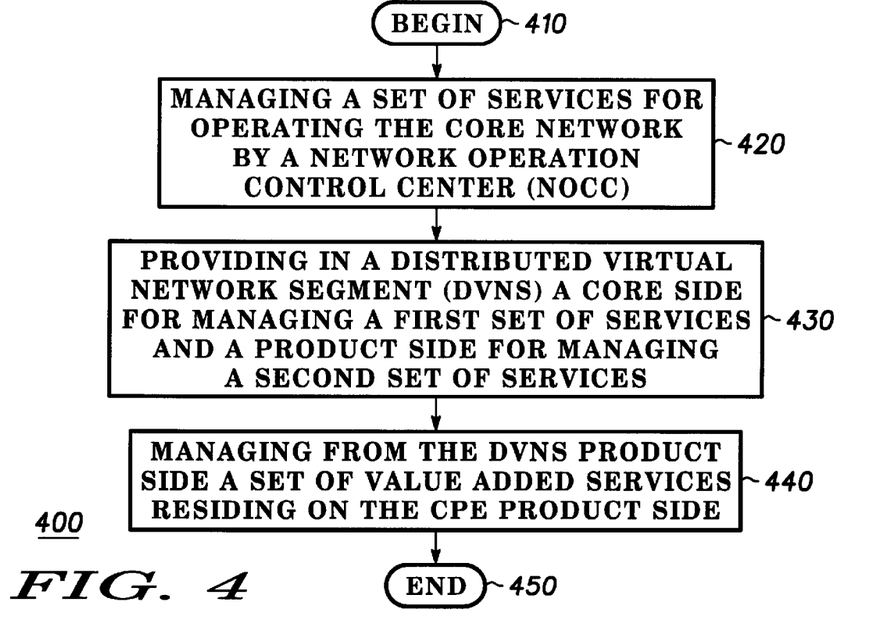
FIG. 4 illustrates a flow diagram of a method for managing services in a communication system in accordance with a preferred embodiment of the present invention.

FIG. 4 illustrate a flow diagram of a method for managing services in a communication system in accordance with a preferred embodiment of the present invention. Method 400, in a preferred embodiment, is employed for managing services in a multilayered architecture in a satellite communication system such as system 100 (FIG. 1) comprising a core network 230 (FIG. 2) and one or more DVNSs 330 (FIG. 3). Service management desirably is distributed across the layers and resides primarily in components of two of the layers, NOCC 310 (FIG. 3) and DVNS 330 (FIG. 3). NOCC 310 desirably manages overall core services such as connectivity and data transport. DVNS 330 desirably manages services at the DVNS core side and DVNS product side to provide overall DVNS level management.

Method 400 begins in step 410. In step 420, the system manages a set of services for operating the core network. Preferably, step 420 is executed by a network operation control facility, such as NOCC 310 associated with the core network and an overall system management domain, such as System Management Domain 210 (FIG. 2).

In step 430, a core side 340 (FIG. 3) is provided in DVNS 330 (FIG. 3) for managing a first set of services associated with operating the DVNS equipment, and a product side 335 (FIG. 3) is provided for managing a second set of services which enable an operator of the DVNS to provide services to CPE 370 (FIG. 3) associated with the DVNS. As discussed above, in a preferred embodiment, the first set of services managed at DVNS core side 340 includes service features that are built into the DVNS. Desirably these features include features necessary for operation of the DVNS equipment. In a preferred embodiment, the second set of services managed at DVNS product side 335 includes one or more optional features which can be built into the DVNS or can be new, previously existing or added services which can be added to the DVNS after delivery. Thus, method 430 enables the DVNS operator to provide to its end users services which are not necessarily provided by the operator of the system.

In step 440, the system also can manage from DVNS product side 335 a set of value added services 352, if any, residing on the CPE product side 380 (FIG. 3). This remote management of customer value added services is accomplished via interfaces which allow the DVNS access into the information located at the CPE product side. After step 440, the method ends in step 450.

Figure 5:
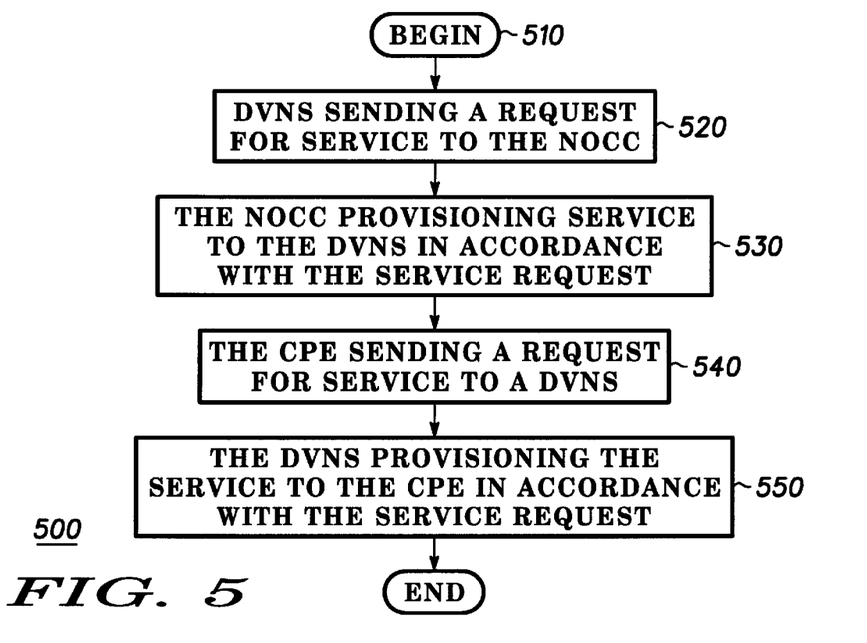
FIG. 5 illustrates a flow diagram of a method for provisioning services through a multilayer service management system in accordance with a preferred embodiment of the present invention.

FIG. 5 illustrates a flow diagram of a method 500 for provisioning services through a multilayer service management system in accordance with a preferred embodiment of the present invention. Method 500 enables services provided through a multilayer communication system to be managed across all layers of the system. In method 500, services that are provided by the NOCC (e.g., wholesale backbone types of services) are first provisioned to the DVNS. The DVNS then can set up a customer base of CPE and retail backbone services and provide/sell additional services to the CPE operator (e.g., the customer or end-user). Once the CPE is provisioned with services or set up to use services provided by the DVNS, the CPE may then send requests to the DVNS to use those services to communicate with other CPE (e.g., end users, content providers, and/or service providers). Method 500 is described in further detail below.

Method 500 begins in step 510. In step 520, the DVNS sends a request for service to the NOCC. In step 530, the NOCC then provisions service to the DVNS in accordance with the service request as described in further detail with reference to FIG. 6. As part of method 500, services also can be managed between the DVNS and CPE wherein in step 540, the CPE sends a request for service to the DVNS, and in step 550 the DVNS provisions services to the CPE in accordance with the service request from the CPE. The details of service provisioning by a DVNS to a CPE unit are described in further detail with reference to FIG. 8. After step 550, the method ends in step 560.

Figure 6:
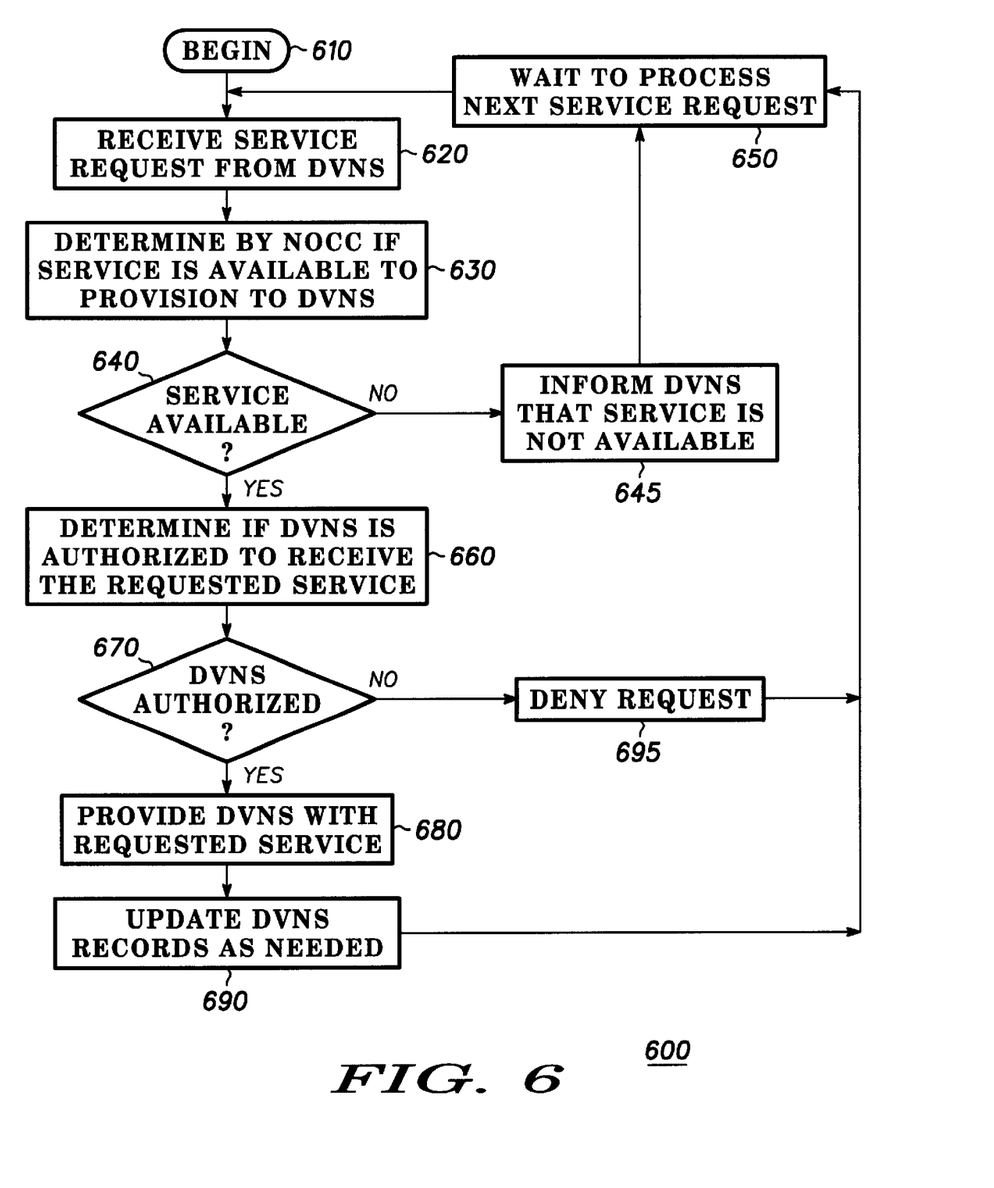
FIG. 6 illustrates a flow diagram of a method for provisioning services from a Network Operation Control Center (NOCC) to a Distributed Virtual Network Segment (DVNS) in accordance with the method described with reference to FIG. 5.

FIG. 6 illustrates a flow diagram of a method for provisioning services from a NOCC to a DVNS in accordance with the method described with reference to step 530 of FIG. 5. Method 600 can be used to manage a request for provision of a new service or to manage the operation of established service between the NOCC and a DVNS.

Method 600 begins in step 610. In step 620, the NOCC receives a service request from the DVNS. The NOCC determines in step 630 if the requested service is available to provide to the DVNS. For example, the NOCC checks to make sure the requested service is a viable service and one offered through the system. If a determination is made in step 640 the service is not available, for example the service is not a service which is offered (or otherwise available) through the system, then in step 645 the NOCC informs the DVNS that the service is not available, and in step 650 the NOCC waits to process the next service request.

If a determination is made in step 640 that the service is available, the NOCC, in step 660 determines if the DVNS is authorized to receive the service. For example, the NOCC checks its records regarding the DVNS to determine if the DVNS records show that the DVNS in good standing (e.g., is current on payments or other criteria favorable to providing service). If a determination is made in step 670 that the DVNS is authorized to receive service, then the NOCC provides the DVNS with the service in step 680 (or otherwise allows the DVNS to use the service), and the NOCC then updates its records regarding the DVNS as appropriate in step 690 (e.g., to reflect the addition of the new service for billing or other purposes). If, by contrast, the NOCC determines in step 670 that the DVNS is not authorized to receive the requested service, then the NOCC will deny the service request in step 695 and waits to process the next service request in step 650.

Figure 7:
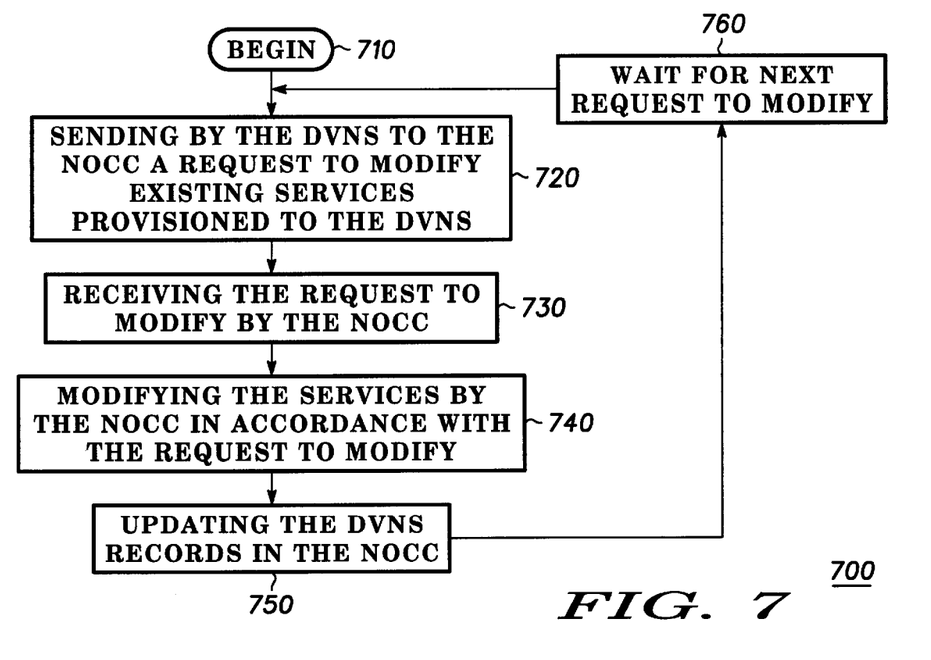
FIG. 7 illustrates a flow diagram of a method for managing service modifications between a core network and a DVNS in a satellite communication system in accordance with a preferred embodiment of the present invention.

FIG. 7 illustrates a flow diagram of a method for managing service modifications between a core network and a DVNS in a satellite communication system in accordance with a preferred embodiment of the present invention. Method 700 can be used to modify existing services provided to a DVNS or to delete an existing service between the NOCC and a DVNS.

Method 700 begins in step 710. In step 720, the DVNS sends the NOCC a request to modify one or more existing services provisioned to the DVNS. The request could be to delete or discontinue or to otherwise change a particular service or feature. The NOCC receives the request to modify services in step 730 and modifies the services provided in step 740 in accordance with the request modify the services. In step 750, the NOCC updates its records regarding the DVNS as appropriate and then waits for the next request to modify in step 760.

Figure 8:
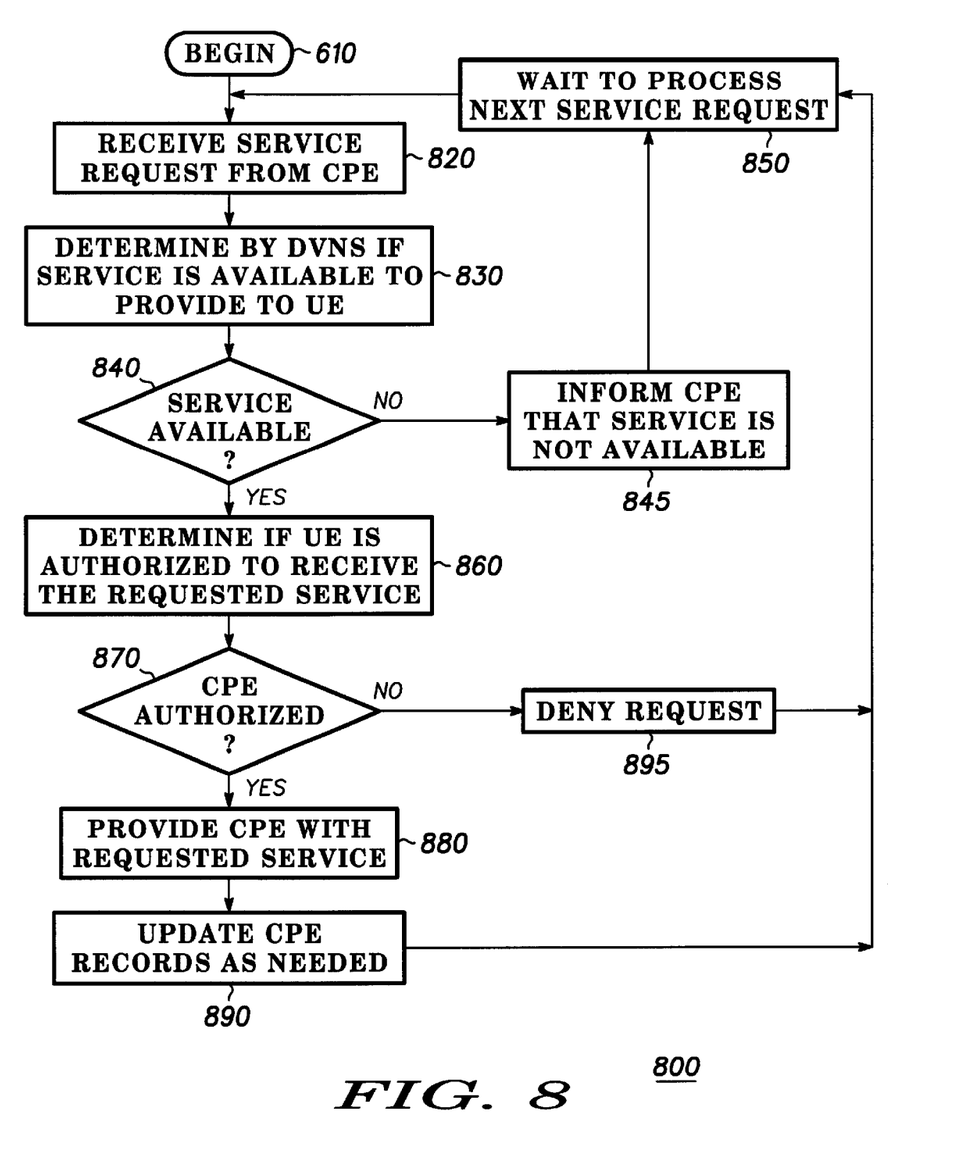
FIG. 8 illustrates a flow diagram of a method for provisioning services from a DVNS to customer premesis equipment (CPE) in accordance with the method described with reference to FIG. 5.

FIG. 8 illustrates a flow diagram of a method 800 for provisioning services from a DVNS to CPE in accordance with the method described with reference to step 550 of FIG. 5. Method 800 enables management of service requests for new service and/or the operation of established service between the DVNS and CPE.

Method 800 begins in step 810. In step 820, the DVNS receives a service request from CPE. The DVNS determines in step 830 if the requested service is available to provide to the CPE. For example, the DVNS checks to make sure the requested service is a viable service, or one available to be provided by or through the DVNS. If a determination is made in step 840 that the service is not available, for example the service is not a service which is provided by or through the DVNS, then in step 845 the DVNS informs the CPE that the service is not available, and in step 850 the DVNS waits to process the next service request.

If a determination is made in step 840 that the service is available to provide to the CPE, the DVNS, in step 860 determines if the CPE is authorized to receive the requested service. For example, the DVNS checks its records regarding the CPE to determine if the CPE records show that the CPE is in good standing (e.g., is current on payments or other criteria favorable to providing service). If a determination is made in step 870 that the CPE is authorized to receive the requested service, then the DVNS provides the CPE with the requested service in step 880 (or otherwise allows the CPE to use or access the service), and the DVNS updates its records regarding the CPE as appropriate in step 890 (e.g., to reflect the addition of the new service for billing or other purposes). If, by contrast, the DVNS determines in step 870 that the CPE is not authorized to receive the requested service, then the DVNS will deny the service request in step 895 and wait to process the next service request in step 850.

Figure 9:
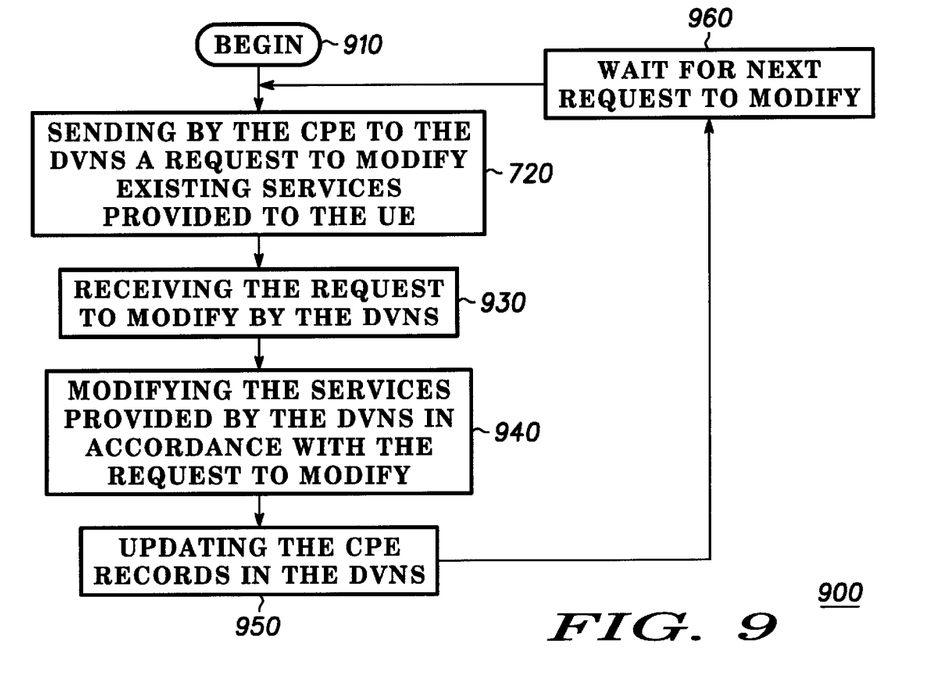
FIG. 9 illustrates a flow diagram of a method for managing service modifications between a DVNS and a communication terminal in a satellite communication system in accordance with a preferred embodiment of the present invention.

FIG. 9 illustrates a flow diagram of a method for managing service modifications between a DVNS and a communication terminal in a satellite communication system in accordance with a preferred embodiment of the present invention. Method 900 can be used to modify existing services provided to the CPE or to delete an existing service being provided by or through the DVNS to the CPE.

Method 900 begins in step 910. In step 920, the CPE sends the DVNS a request to modify one or more existing service provided to the CPE by or through the DVNS. The request could be to delete or discontinue or to otherwise change a particular service or feature. The DVNS receives the request to modify services in step 930 and modifies the services provided in step 940 in accordance with the request to modify the services. In step 950, the DVNS updates its records regarding the CPE as appropriate and then waits for the next request to modify in step 960.

A preferred embodiment of the present invention has been described as including a LEO satellite network. Those of skill in the art will appreciate, however, that the service management system and method of the present invention is not dependent upon the type of network (e.g., satellite or terrestrial) in which the method or system of the invention are practiced. Thus, in an alternate embodiment, the method and system of the present invention could also be practiced in a terrestrial network having a multi-layered architecture, for example. In other alternate embodiments, the network could be, at least in part, a satellite-based network utilizing MEO or even GEO satellites.

The foregoing description of the specific embodiments will so fully reveal the general nature of the invention that others can, by applying current knowledge, readily modify or adapt for various applications such specific embodiments without departing from the generic concept and, therefore, such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A service management system for use in a communication system having a core network comprising, at least in part, a plurality of satellites, said service management system comprising:

a network operations control center (NOCC) having a network service manager capable of managing a set of core services for operating the core network;

a distributed virtual network segment (DVNS) having a product side and a core side, the core side being linked in communication with said network service manager of said NOCC and including a DVNSM capable of managing a first set of services, and the product side including a distributed virtual network segment service manager (DVNSM) capable of managing a second set of services;

wherein said first set of services comprise one or more service features which are built-in to said DVNS for operating said DVNS; and wherein said second set of services comprise one or more optional services features which enable a DVNS operator to provide services to end users.

2. The communication system as claimed in claim 1, wherein said set of core services for operating the core network comprises connectivity and information transportation services.

3. The communication system as claimed in claim 1, wherein said first set of services comprises connection services and information transport services for operating said DVNS.

4. The communication system as claimed in claim 1, wherein said second set of services comprises one or more services selected from the group of services consisting of authentication services, security management, call intercept services, fault management, configuration management, nomadicity, account management, and performance management.

5. The communication system as claimed in claim 1, wherein said DVNS product side includes means for creating and adding a third set of services to said DVNS.

6. The communication system as claimed in claim 3, wherein said means for creating and adding comprises a service creator for enabling a DVNS operator to add said third set of services to said DVNS.

7. The communication system as claimed in claim 5, wherein said third set of services comprises one or more value added services from an external source which can be provided through a DVNS operator.

8. The communication system as claimed in claim 7, further comprising:

at least one item of customer premesis equipment (CPE), said CPE comprising a CPE product side and a CPE core side, said CPE product side including a processor capable of enabling provision of value added services in said CPE.

9. The communication system as claimed in claim 8, wherein said value added services comprise one or more services selected from the group of services consisting of business related services, banking services, on-line commerce, distant learning services, interactive TV, telemedicine, encryption, Internet/email access, leisure activities, software services, teleconferencing, usage reporting, and video conferencing.

\* \* \* \* \*